United States Patent
Montagne

(10) Patent No.: US 10,473,060 B2
(45) Date of Patent: Nov. 12, 2019

(54) METHOD AND SYSTEM FOR A GAS TURBINE ENGINE AIR VENTILATION PURGE CIRCUIT

(71) Applicant: General Electric Company, Schenectady, NY (US)

(72) Inventor: Pierre Montagne, Lay Saint Christophe (FR)

(73) Assignee: General Electric Company, Schenectady, NY (US)

( * ) Notice: Subject to any disclaimer, the term of this patent is extended or adjusted under 35 U.S.C. 154(b) by 784 days.

(21) Appl. No.: 14/966,513

(22) Filed: Dec. 11, 2015

(65) Prior Publication Data

US 2016/0177878 A1   Jun. 23, 2016

(30) Foreign Application Priority Data

Dec. 23, 2014   (FR) .................................... 14 63238

(51) Int. Cl.
| | |
|---|---|
| *F02C 7/22* | (2006.01) |
| *F02M 23/14* | (2006.01) |
| *F23K 5/18* | (2006.01) |
| *F23D 17/00* | (2006.01) |
| *F23D 14/72* | (2006.01) |
| *F02C 9/26* | (2006.01) |
| *F02C 7/057* | (2006.01) |

(Continued)

(52) U.S. Cl.
CPC ............. *F02M 23/14* (2013.01); *F02C 7/057* (2013.01); *F02C 7/22* (2013.01); *F02C 7/222* (2013.01); *F02C 7/232* (2013.01); *F02C 9/26* (2013.01); *F02M 55/007* (2013.01); *F23D 14/72* (2013.01); *F23D 17/002* (2013.01); *F23K 5/18* (2013.01); *F02M 2023/008* (2013.01)

(58) Field of Classification Search
CPC .. F02C 7/22; F02C 7/222; F02C 7/232; F02C 9/26; F23K 5/18; F23D 17/002; F23D 14/72; F23D 2209/30; F05B 2260/602
See application file for complete search history.

(56) References Cited

U.S. PATENT DOCUMENTS

| | | | | |
|---|---|---|---|---|
| 4,964,270 | A | * | 10/1990 | Taylor ..................... F02C 7/232 60/39.094 |
| 5,138,988 | A | * | 8/1992 | Distelrath ............. F02F 1/4235 123/184.52 |

(Continued)

*Primary Examiner* — William H Rodriguez
*Assistant Examiner* — Kyle Robert Thomas
(74) *Attorney, Agent, or Firm* — Armstrong Teasdale LLP

(57) ABSTRACT

A method and fuel supply system for supply of a combustion chamber with at least one combustible fluid are provided. The fuel supply system includes a combustion chamber, at least one supply circuit, and at least one purge circuit, the purge circuit coupled to the at least one supply circuit, the purge circuit including at least two isolation valves defining a cavity between, a source of relatively high temperature purge air coupled in flow communication to the cavity through one of the at least two isolation valves, a source of relatively low temperature ventilation air coupled in flow communication to the cavity, and a vent coupled in flow communication to the cavity, the at least one purge circuit configured to channel a flow of relatively low temperature ventilation air from the source relatively low temperature ventilation air through the cavity to the vent during operation of the combustion chamber.

20 Claims, 5 Drawing Sheets

(51) Int. Cl.
  *F02M 55/00*    (2006.01)
  *F02C 7/232*    (2006.01)
  *F02M 23/00*    (2006.01)

(56) References Cited

U.S. PATENT DOCUMENTS

| | | | | |
|---|---|---|---|---|
| 6,438,963 | B1* | 8/2002 | Traver | F23K 5/147 |
| | | | | 60/39.094 |
| 2009/0151353 | A1* | 6/2009 | Chillar | F02C 3/34 |
| | | | | 60/605.2 |
| 2009/0320480 | A1* | 12/2009 | Scully | F02C 7/228 |
| | | | | 60/734 |
| 2011/0036092 | A1* | 2/2011 | Lawson | F23K 5/002 |
| | | | | 60/772 |
| 2013/0031899 | A1 | 2/2013 | Budliger et al. | |
| 2013/0074945 | A1 | 3/2013 | Karaca et al. | |
| 2013/0118178 | A1* | 5/2013 | Sabelhaus | F02C 7/232 |
| | | | | 60/772 |
| 2013/0167935 | A1 | 7/2013 | Lawson et al. | |
| 2015/0128597 | A1* | 5/2015 | Schlak | F03B 13/00 |
| | | | | 60/719 |
| 2015/0251766 | A1* | 9/2015 | Atkey | B64D 13/08 |
| | | | | 244/13 |
| 2015/0330869 | A1* | 11/2015 | Ziarno | G01M 15/14 |
| | | | | 701/34.4 |
| 2016/0076461 | A1* | 3/2016 | Kawai | F02C 9/40 |
| | | | | 60/772 |

* cited by examiner

| | 122 | 124 | 120 | 110 | 144 | 132 | 148 |
|---|---|---|---|---|---|---|---|
| Compressor Air Supply To Ventilate | C | C | C | O | C | O | O |
| Instrument Air Supply To Ventilate | C | C | C | O | O | C | O |

METHOD AND SYSTEM FOR A GAS TURBINE ENGINE AIR VENTILATION PURGE CIRCUIT

CROSS REFERENCE TO RELATED APPLICATIONS

This application claims the benefit of French Patent Application No. 1463238 filed on Dec. 23, 2014, the entirety of which is incorporated herein.

BACKGROUND

The field of the disclosure relates generally to gas turbine engines and, more particularly, to a system and method of supplying a purge fluid to a cavity of a fuel supply circuit.

At least some known gas turbines include a compressor, one or more combustion chambers, and an expansion turbine. The combustion chambers are supplied with gaseous fuel through a fuel supply system to be mixed therein with pressurized relatively high temperature air from the compressor. The fuel supply system permits several types of fuels, for example, natural gas, liquid fuel or synthetic gas or "syngas" to be supplied to the combustion chambers. The fuel supply system permits regulating a plurality of fuel supply system parameters from the fuel source to the one or more combustion chambers. Specifically, fuel supply systems typically permit regulating the fuel pressure, fuel temperature and fuel flow to the one or more combustion chambers.

To permit routing and transfer of various types of fuels to the gas turbine, ensure regulation of pressure, temperature and flow conditions, the supply circuit includes isolation valves, flow regulation valves, and cooling and filtration systems.

Furthermore, the fuel supply system must be capable of ensuring separation of portions of the fuel supply system, for example, of cavities, to avoid contact between relatively high temperature air and the gaseous fuel sources to prevent self-ignition of the fuel and creation of explosive mixtures. Typically, a gas turbine is operated on one of two types of fuels. For example, the first fuel is natural gas and the second fuel is synthetic gas or syngas, each fuel supplied through a separate circuit for at least a portion of the fuel supply system. Each fuel circuit, when not in use, may be purged with relatively high temperature air extracted from the turbine compressor. To isolate each fuel circuit from this relatively high temperature air, a cavity sometimes referred to as a "double block and bleed" valve arrangement is generally used. When the valves of the "block and bleed" valve arrangement are incorporated in a single component, the single component is referred to as a block and bleed manifold. After using a fuel supply circuit, it is purged with an inert gas, for example, nitrogen, before introduction of relatively high temperature scavenging air to avoid creating an undesirable mixture.

For example, if the second fuel supply circuit is isolated during a securing of the gas turbine or a change of fuel from the second fuel to the first fuel, no fuel circulates in the second fuel circuit and the supply circuit of the second fuel is purged with relatively high temperature air. During this purge phase, a flow of relatively high temperature air is maintained towards the passages in the injectors provided for the second fuel to avoid condensation, burning the nozzle tip, and limit the risk of a return of gas from the combustion chamber to the second fuel supply circuit.

When the valves controlling the fuel or relatively high temperature air supply for purging are closed, there still is a risk that, in some cases, of fuel gas leakage into the dead leg cavities formed by the isolation valves and thus causing a risk of contact between the relatively high temperature purge air, whose temperature may attain 500° C., and the fuel.

Known solutions using inert gases to ensure separation between the fuel and relatively high temperature purge air include filling a cavity between two isolation valves with inert gas at a predetermined pressure and maintaining an appropriate pressure to compensate for any fuel pressure and relatively high temperature purge air pressure variations.

The inert gas pressure level is selected based on an expected maximum fuel pressure or relatively high temperature purge air pressure. Maintaining a high pressure of inert gas in the cavity may require an expensive compression system and may also consume a large quantity of inert gas to make-up for leakage through, for example, the isolation valves. Maintaining a high pressure of inert gas in the cavity may also be influenced by other factors, such as ambient temperature and turbine load level. This technique also imposes the need for storage of inert gas at high pressure.

Furthermore, cleaning of the isolation valves of the fuel supply circuit is needed for the efficient operation of the gas turbine and of the fuel supply circuit. Thus, a leaking valve is likely to cause a stoppage of the gas turbine or a dangerous mix of fuel with other fluids present in the fuel supply circuit or in the purge circuit, even in the turbine control circuit.

Maintenance of the block and bleed valves is conducted through physical inspection and/or through pressurization tests, which are laborious and require decommissioning of the turbine during the time period of the inspection or tests. Although other methods permit testing the valves online, these methods require changing the turbine fuel supply circuit and installing branches or bypasses to ensure continuous supply of fuel to the combustion chambers.

BRIEF DESCRIPTION

In one aspect, a fuel supply system for supply of a combustion chamber with at least one combustible fluid is provided. The fuel supply system includes a combustion chamber including a fuel injector, at least one supply circuit configured to supply the combustion chamber with a combustible fluid, and at least one purge circuit coupled in flow communication with the at least one supply circuit. The at least one purge circuit includes at least two isolation valves defining a cavity between the at least two isolation valves and a source of relatively high temperature purge air coupled in flow communication to the cavity through one of the at least two isolation valves. The at least one purge circuit also includes a source of relatively low temperature ventilation air and a vent both coupled in flow communication to the cavity. The at least one purge circuit is configured to channel a flow of relatively low temperature ventilation air from the source of relatively low temperature ventilation air through the cavity to the vent during operation of the combustion chamber.

In another aspect, a method of supplying a combustion chamber with at least one combustible fluid using a fuel supply system is provided. The fuel supply system is coupled in flow communication with a first purge system that includes at least two isolation valves that define a cavity therebetween. The method includes channeling the at least one combustible fluid to the combustion chamber through a fuel supply isolation valve, capturing combustible fluid leaking by any of the at least two isolation valves into the cavity, and entraining the leaking combustible fluid in a flow of ventilation air directed into the cavity and exiting the cavity through a vent to atmosphere.

In yet another aspect, a gas turbine engine system includes a compressor including a low pressure inlet, a high pressure outlet, and a bleed port configured to extract air at a pressure between the low pressure inlet and the high pressure outlet. The gas turbine engine system also includes a combustion chamber including a fuel injector, a turbine coupled in serial flow communication with the compressor and the combustion chamber, and at least one supply circuit configured to supply the combustion chamber with a combustible fluid. The gas turbine engine system also includes at least one purge circuit coupled in flow communication with the at least one supply circuit. The purge circuit includes at least two isolation valves defining a cavity between the at least two isolation valves, a source of relatively high temperature purge air coupled in flow communication to the cavity through one of the at least two isolation valves, a source of relatively low temperature ventilation air coupled in flow communication to the cavity, and a vent coupled in flow communication to the cavity. The at least one purge circuit is configured to channel a flow of relatively low temperature ventilation air from the source relatively low temperature ventilation air through the cavity to the vent during operation of the combustion chamber.

DRAWINGS

These and other features, aspects, and advantages of the present disclosure will become better understood when the following detailed description is read with reference to the accompanying drawings in which like characters represent like parts throughout the drawings, wherein.

Figures 1, 2:
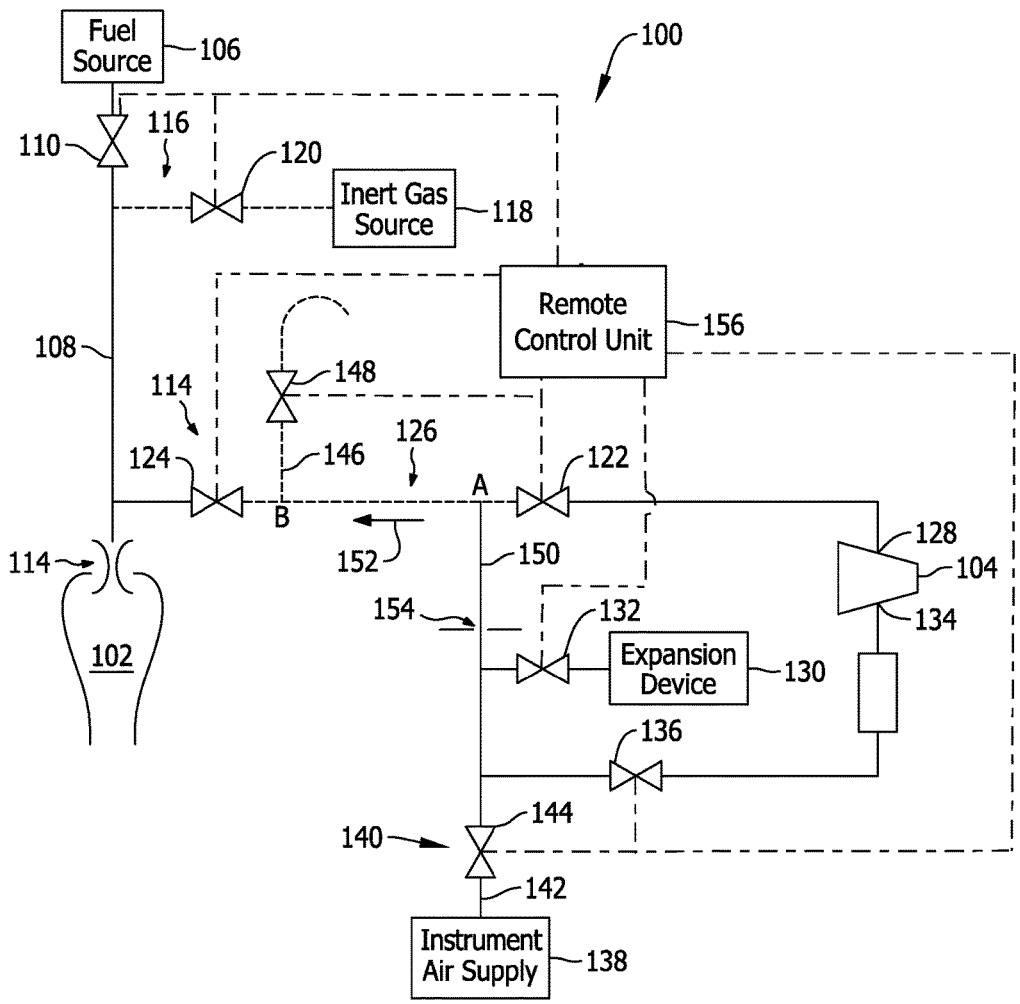
FIG. 1 is a schematic piping diagram of a fuel supply system of a combustion chamber of a gas turbine engine.
FIG. 2 is a logic table illustrating a state of the fuel supply system shown in FIG. 1 in a plurality of modes of operation.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure describe a fuel supply system configured to channel a flow of at least one combustible fluid to a combustion chamber. The fuel supply system includes at least one circuit for supplying the combustion chamber with the at least one combustible fluid and at least a first purge circuit. The fuel supply system includes at least two isolation valves defining a cavity in between them. The at least first purge circuit is coupled in flow communication to a relatively high temperature air source and to the fuel supply system. In various embodiments, the fuel supply system includes a second purge circuit configured to channel relatively cool ventilation air flow into the cavity. In an embodiment, relatively cool air flow is channeled into the cavity at a temperature lower than the first purge air temperature and selected to avoid self-ignition of combustible gases that eventually come in contact with the relatively high temperature purge air from the first purge circuit. Accordingly, a risk of self-ignition and creation of explosive mixtures is reduced without having to inject an inert gas flow in the cavity, which is an expensive procedure.

In an embodiment, the at least one purge circuit includes ventilation devices configured to couple in flow communication to an instrumentation gas source, for example, air, at relatively high pressure associated with a valve for setting a flow of instrumentation gas. For example, the at least one purge circuit includes ventilation devices configured to couple in flow communication to a compressor, for example, a main compressor of a gas turbine engine and expansion and cooling devices to inject a cooled purge air flow from the main compressor into the cavity. In various embodiments, the at least one purge circuits include a calibrated passage for setting of the ventilation air flow injected into the cavity. In other embodiments, the cavity includes a ventilation air evacuation vent, which ends outside the fuel supply system.

FIG. 1 is a schematic piping diagram of a fuel supply system 100 of a combustion chamber 102 of a gas turbine engine (not shown). In the exemplary embodiments described herein, fuel supply system 100 includes various purge systems configured to facilitate avoiding or reducing a probability of any contact between relatively high temperature purge air from a turbine compressor 104 of the gas turbine engine and combustible fluid in fuel supply system 100.

In the exemplary embodiment, fuel supply system 100 includes a source 106 of fuel gas, for example, a gaseous fuel, such as natural gas, liquid fuel or synthetic gas or "syngas." A fuel supply circuit 108 is configured to channel the fuel from fuel source 106 through a fuel supply system isolation valve 110 to one or more fuel injectors 112 of combustion chamber 102. In the exemplary embodiment, fuel source 106 represents a plurality of fuel supply piping arrangements configured to provide various types of fuel to fuel supply circuit 108 and ultimately to fuel injector 112.

Fuel supply system 100 also includes a first purge system 114, which is configured to supply purge air to fuel supply circuit 108. In one embodiment, a source of purge air is turbine compressor 104. First purge system 114 is configured to continuously purge fuel supply circuit 108 and injectors 112 with relatively high temperature air from turbine compressor 104 to facilitate reducing a formation of condensates and a return of gas from combustion chamber 102 to fuel supply circuit 108.

Fuel supply system 100 also includes a second inert gas purge circuit 116 that is coupled in flow communication with fuel supply circuit 108 upstream from first purge system 114. Inert gas purge circuit 116 includes a source of inert gas 118 that is coupled in flow communication with fuel supply circuit 108 through an inert gas purge circuit isolation valve 120. Inert gas purge circuit 116 also facilitates avoiding any contact between the fuel and relatively high temperature air from turbine compressor 104.

First purge system 114 includes an upstream purge circuit isolation valve 122 and a downstream purge circuit isolation valve 124, which are provided to avoid contact between relatively high temperature purge air and fuel, during normal operation of fuel supply system 100.

Upstream purge circuit isolation valve 122 and downstream purge circuit isolation valve 124 define a cavity 126 between them, i.e. a part of first purge system 114 isolating the relatively high temperature purge air supply lines and the fuel supply lines. As indicated above, specifically due to the size of the valves in a gas turbine supply installation, there could be potential combustible gas leaks through upstream purge circuit isolation valve 122 and potential relatively high temperature air leaks downstream purge circuit isolation valve 124, even when closed.

To avoid possible contact between relatively high temperature purge air and fuel in cavity 126, fuel supply system 100 includes alternate purge air paths, which maintain a relatively cool air flow in cavity 126, i.e. at a temperature lower than that of relatively high temperature purge air such that the gaseous mix in cavity 126 is less than the self-ignition temperature of the fuel. As used herein, relatively cool air is also referred to as "carrier air" in the sense of its purpose is to reduce hot air/fuel mixture temperature and transport this mixture fast enough that it does not have time to self ignite.

In different modes of operation, purge air may be supplied from a plurality of sources through different branches of first purge system 114, for example, relatively high temperature may be extracted from a first bleed port 128 of turbine compressor 104 and supplied directly to first purge system 114 through upstream purge circuit isolation valve 122. In another example, relatively high temperature air from first bleed port 128 is cooled and expanded using an expansion device 130 to lower the temperature and then supplied to first purge system 114 through a ventilation branch isolation valve 132. Alternately, relatively cooler purge air is extracted from a second bleed port 134 of turbine compressor 104 and supplied to first purge system 114 directly or after having been expanded and/or cooled through a relatively cool purge air isolation valve 136. In another example, purge air is supplied at approximately ambient temperature from instrumentation air, i.e. taken from an instrument air supply 138 for control of turbine equipment, specifically at ambient temperature and at a pressure of approximately (typically but not limited to) 6 to 8 bar.

Another branch 140 includes a single supply line 142 in which instrumentation air is supplied from an instrumentation air supply 138 through an instrument air isolation valve 144 for controlling flow of instrument air.

Cavity 126 includes a first vent 146 that includes a first vent isolation valve 148 to control a venting of cavity 126 to, for example, atmosphere outside of fuel supply system 100.

During operation of fuel supply system 100, cavity 126 is supplied with ventilation air through pipe 150, which may be mixed with relatively high temperature air from a leak through upstream purge circuit isolation valve 122, and with a gas leak through downstream purge circuit isolation valve 124 before being released outside through first vent 146 using first vent isolation valve 148.

Accordingly, cavity 126 is continuously ventilated in a first direction 152, which facilitates limiting the air/gas mixture residence time, volume of potentially combustible gas and air mixture, and reduce the overall mixture temperature. The ventilation air residence time in cavity and the air/combustible gas mixture temperature at a connection of first vent 146 to cavity 126 is predetermined to avoid self-ignition of the mixture in cavity 126. For example, a required air flow to ensure that the residence time of combustible gas and air mixture at intermediate temperature (resulting from the high temperature air leak, relatively low temperature carrier air and combustible gas temperatures) renders self-ignition of the gaseous mixture impossible is determined and maintained so that the temperature of the gaseous mixture is lower than is self-ignition temperature. The self-ignition time varies according to the temperature of the gaseous mixture. Pipe 150 includes a calibrated passage 154 capable of maintaining the air flow in cavity 126 to ensure purging the potential fuel leaks through downstream purge circuit isolation valve 124, by passing through first vent 146, and ensuring that the residence time of the gaseous mixture in cavity 126 is less than the self-ignition period of the mixture. Because the self-ignition temperature of the mixture varies with a concentration of gas in the mixture and a temperature of the mixture, the flow through cavity 126 is varied using any of valves 122, 124, 132, 136, 144, and 148.

Fuel supply system 100, first purge system 114 and inert gas purge supply circuit 116 each include a set of isolation valves, such as fuel supply system isolation valve 110, inert gas purge circuit isolation valve 120, upstream purge circuit isolation valve 122, downstream purge circuit isolation valve 124, ventilation branch isolation valve 132, cool purge air isolation valve 136, and instrument air isolation valve 144 are controlled by a remote control unit 156 communicatively coupled to each of valves 110, 120, 122, 124, 132, 136, and 144, as well as other valves of fuel supply system 100, as described below. Remote control unit 156 controls a sequence of operation of the valves to permit implementation of the various phases or states of fuel supply system 100, such as, a supply phase and a purge phase.

FIG. 2 is a logic table 200 illustrating a state of fuel supply system 100 (shown in FIG. 1) in a plurality of modes of operation. During normal operation of fuel supply system 100, i.e. when fuel injectors 112 are supplied with fuel and cavity 126 is purged with purge air from turbine compressor 104, as illustrated in row 202 of logic table 200, fuel supply system isolation valve 110, ventilation branch isolation valve 132, and first vent isolation valve 148 are open (state O). Valves inert gas purge circuit isolation valve 120, upstream purge circuit isolation valve 122, downstream purge circuit isolation valve 124, and instrument air isolation valve 144 are closed (state C). When instrument air is used to purge cavity 126 during normal operation, ventilation branch isolation valve 132 is closed and instrument air isolation valve 144 is opened. Other sources of purge air may be used by operating their respective isolation valves. Additionally, mixing of the various sources of air may be accomplished using metering or modulating valves to automatically adjust flow in each branch to achieve a determined flow and/or purge air temperature.

Figure 3:
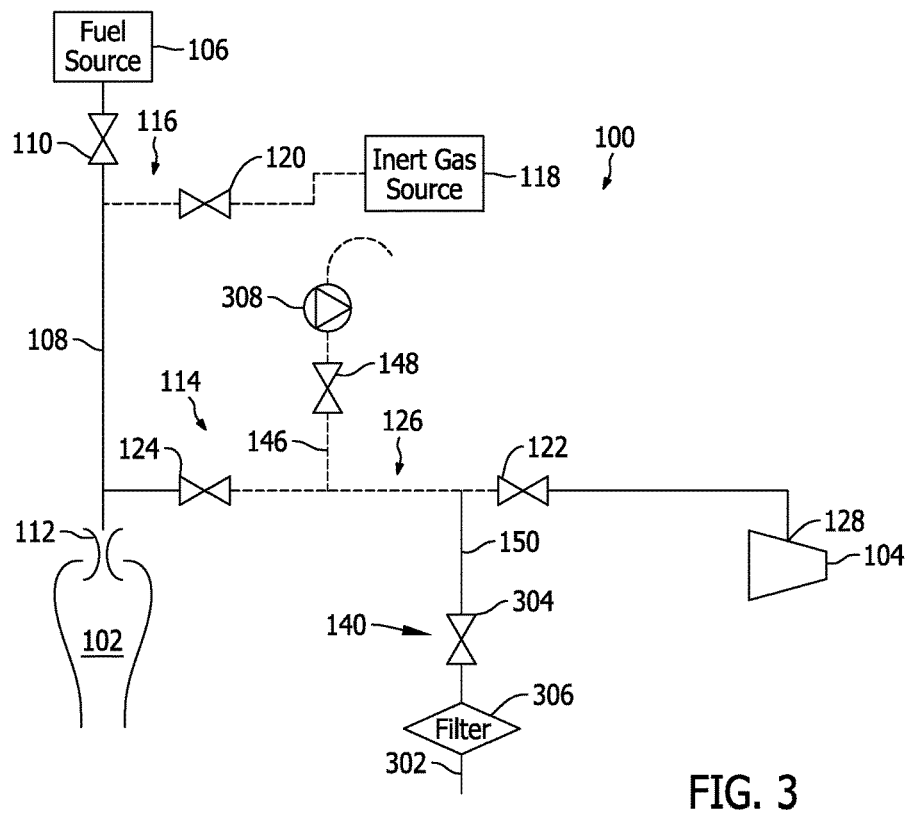
FIG. 3 is a schematic piping diagram of the fuel supply system in accordance with another exemplary embodiment of the present disclosure.

FIGS. 3-9 illustrate various embodiments of supplying cavity 126 with purge air. FIG. 3 is a schematic piping diagram of fuel supply system 100 for a combustion chamber 102 of a gas turbine engine (not shown) in accordance with another exemplary embodiment of the present disclosure. In the example embodiment, fuel supply system 100 includes a line 302 configured to receive ambient air. Line 302 includes a fresh air isolation valve 304 and a filter 306. Cavity 126 includes first vent 146 including first vent isolation valve 148. First vent 146 is coupled in flow communication to cavity 126 proximate downstream purge circuit isolation valve 124. First vent 146 also includes an extraction fan 308.

In this operational mode, fan 308 is sized to generate a flow that depends on the type of gas and relatively high temperature purge air temperature. In particular, the fan is sized such that the extraction flow is sufficient to avoid any contact between the fuel and relatively high temperature purge air that may be present in cavity 126 for a period equal to or greater than the self-ignition period.

Alternatively, fan 308 may be sized to generate sufficient displacement speed to evacuate the fuel/air mixture before self-ignition or adjust the gas flow by providing a calibrated passage (not shown) in line 302 downstream of fresh air isolation valve 304.

In this mode of operation mode, cavity 126 is depressurized. Because relatively high temperature purge air is generally at a pressure greater than 10 bars, the venturi effect generated by the speed of air passing through cavity 126, and acting on an eventual leak from upstream purge circuit isolation valve 122, is negligible compared to the pressure difference between cavity 126 and fuel supply circuit 108.

Another benefit of reducing the pressure is that self ignition time and temperature are increasing with reduced pressure, getting the likelihood of self ignition even more remote.

Figure 4:
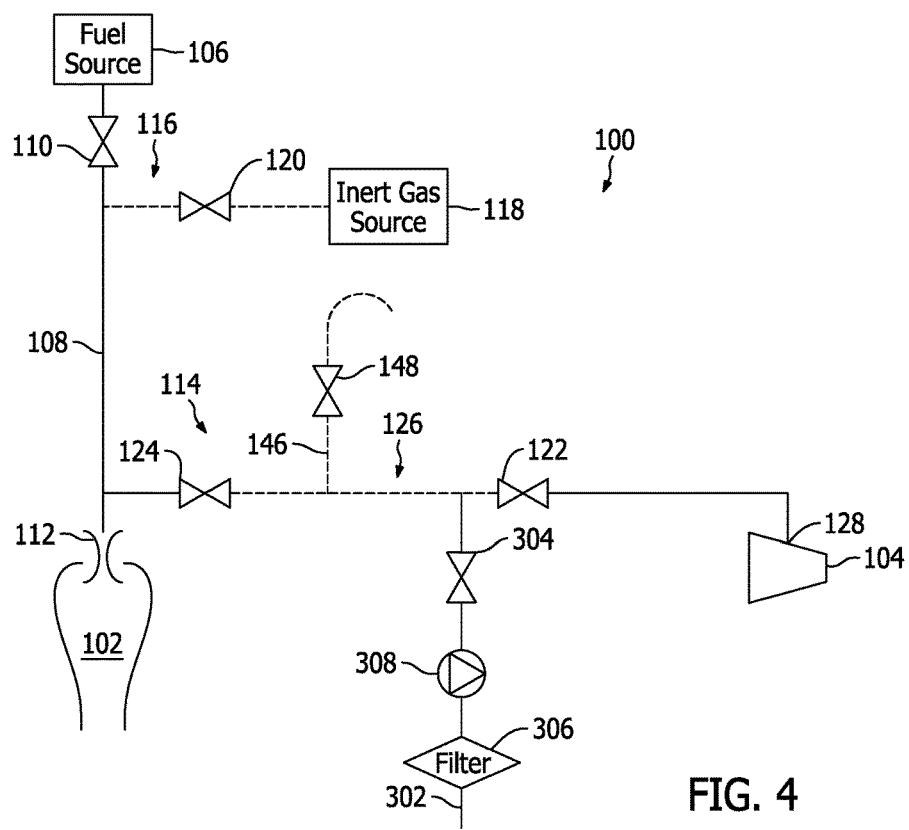
FIG. 4 is a schematic piping diagram of the fuel supply system in accordance with still another exemplary embodiment of the present disclosure.

FIG. 4 is a schematic piping diagram of fuel supply system 100 for a combustion chamber 102 of a gas turbine engine (not shown) in accordance with another exemplary embodiment of the present disclosure similar to the embodiment shown in FIG. 3 except that fan 308 is positioned in line 302 between fresh air isolation valve 304 and filter 306 to maintain forced ventilation of ambient air into cavity 126. The benefit of this variant is to avoid passage of a potentially explosive relatively high temperature air/gas mixture through fan 308, which may under certain conditions ignite.

Figure 5:
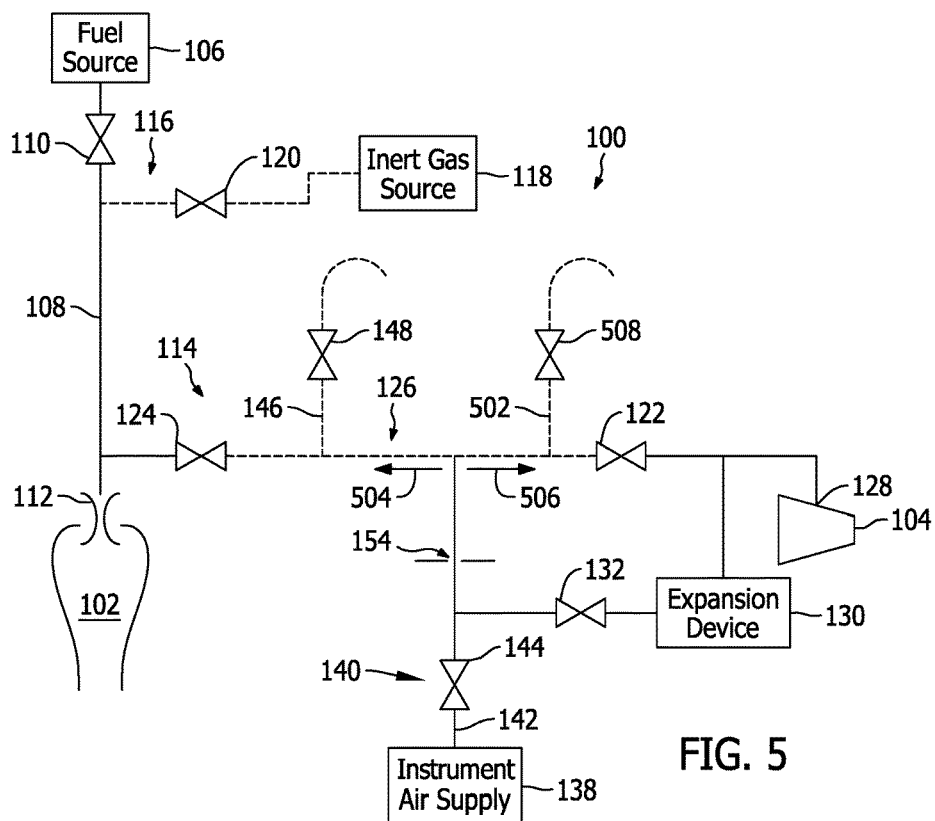
FIG. 5 is a schematic piping diagram of the fuel supply system in accordance with yet another exemplary embodiment of the present disclosure.

FIG. 5 is a schematic piping diagram of fuel supply system 100 for a combustion chamber 102 of a gas turbine engine (not shown) in accordance with another exemplary embodiment of the present disclosure. In the example embodiment, cavity 126 includes two vent lines 146 and 502 provided respectively proximate downstream purge circuit isolation valve 124 and upstream purge circuit isolation valve 122. In this embodiment, the purge air piping is coupled in flow communication with cavity 126 approximately midway between downstream purge circuit isolation valve 124 and upstream purge circuit isolation valve 122.

In the example embodiment, the ventilation air flow injected into cavity 126 is separated into two ventilation flows directed in a first direction 504 and a second direction 506 and evacuated outside through vent lines 146 and 502, each of the flows carry leakage of combustible gas or relatively high temperature air to atmosphere under the control of first vent isolation valve 148 and a second vent isolation valve 508. Accordingly, vent line 146 evacuates a relatively cool air mix and fuel leaks, whereas vent line 502 evacuates a relatively high temperature purge air and intermediate temperature air mix. As used herein, relatively cool air is also referred to as "barrier air" in the sense of its purpose is to physically separate hot air from fuel creating a barrier with flow separation through two independent vents.

Air used to purge cavity 126 is sourced either from instrument air supply 138 or an intermediate stage of turbine compressor 104 after expansion and cooling. The flow of ventilation air must be sufficient to overpower a counter-pressure of leaks and contain each leak by directing it towards the respective vents. The residence time constraints proximate downstream purge circuit isolation valve 124 and the temperature of the mixture limiting any risk of self-ignition are controlled.

Figure 6:
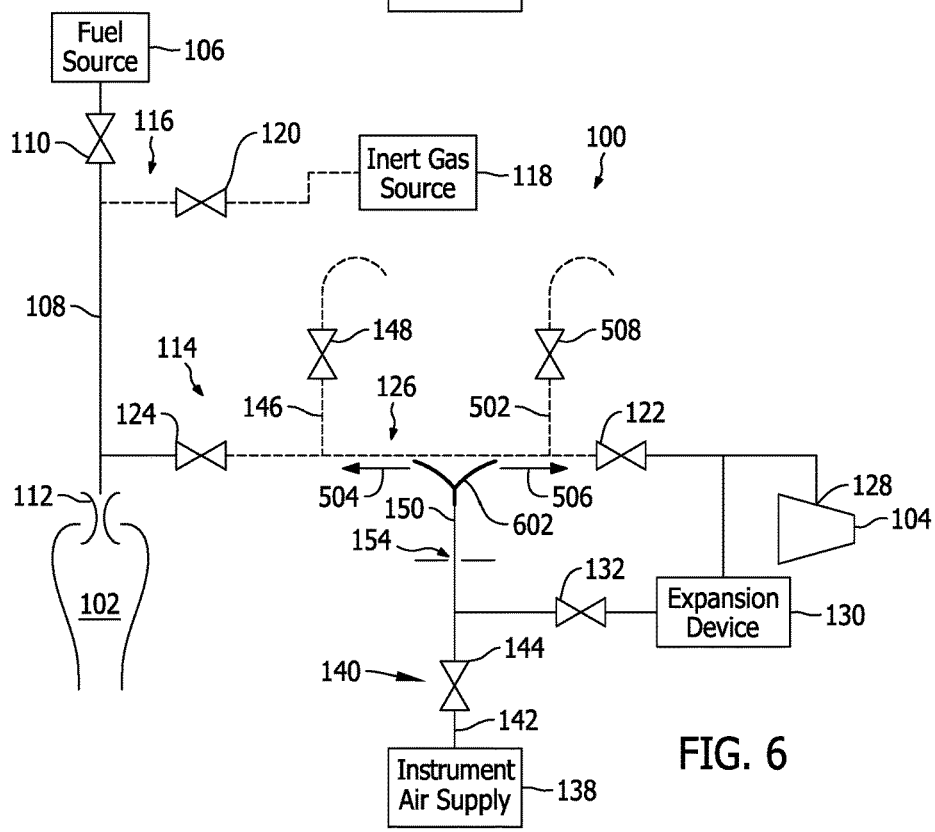
FIG. 6 is a schematic piping diagram of the fuel supply system in accordance with a further exemplary embodiment of the present disclosure.

FIG. 6 is a schematic piping diagram of fuel supply system 100 for a combustion chamber 102 of a gas turbine engine (not shown) in accordance with another exemplary embodiment of the present disclosure. In the example embodiment, cavity 126 includes an aerodynamic profile 602 configured to facilitate separation of the ventilation air flow being channeled from pipe 150 into cavity 126. Aerodynamic profile 602 channels the flow from pipe 150 into two flows respectively directed in directions 504 and 506.

Figure 7:
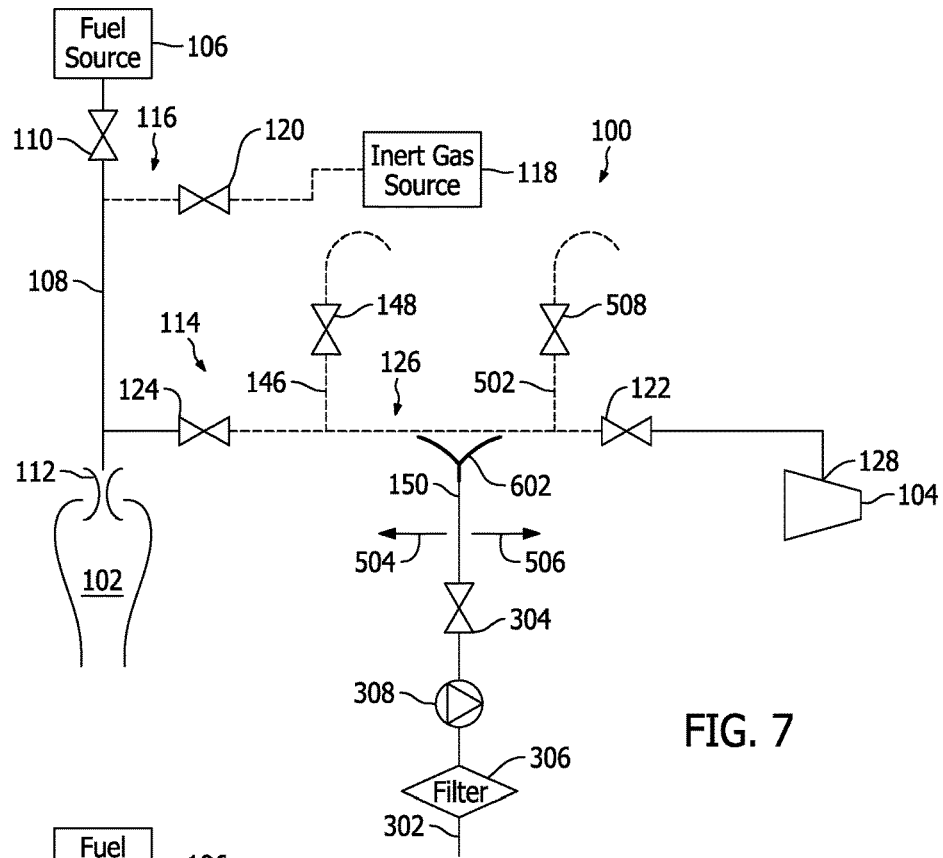
FIG. 7 is a schematic piping diagram in accordance with another exemplary embodiment of the present disclosure.

FIG. 7 is a schematic piping diagram of a fuel supply system 100 for a combustion chamber 102 of a gas turbine engine (not shown) in accordance with another exemplary embodiment of the present disclosure. In the example embodiment, as is also shown in FIGS. 3 and 4, ambient air is used to ventilate cavity 126. Cavity 126 includes two vents, 146 and 502, to atmosphere and may provide for the extraction of ventilation air from outside through line 302. After filtering through filter 306 a forced air flow is generated by fan 308 and divided into two ventilation air flows in aerodynamic profile 602. The air flows are directed in directions 504 and 506 respectively towards downstream purge circuit isolation valve 124 and upstream purge circuit isolation valve 122 through aerodynamic profile 602. In various embodiments, if the forced air flow is sufficient generated by fan 308 is sufficient aerodynamic profile 602 may be optional.

In other embodiments, ventilation air may be drawn in through line 302 a fan (not shown) in each of vents 146 and 502, as described above in reference to FIG. 3. Aerodynamic profile 602 may be realized in the form of a special joint, for example with three branches ensuring connection of line 150 with cavity 126. An advantage of aerodynamic profile 602 includes allowing separation of fluids that can accept more significant leaks.

Figure 8:
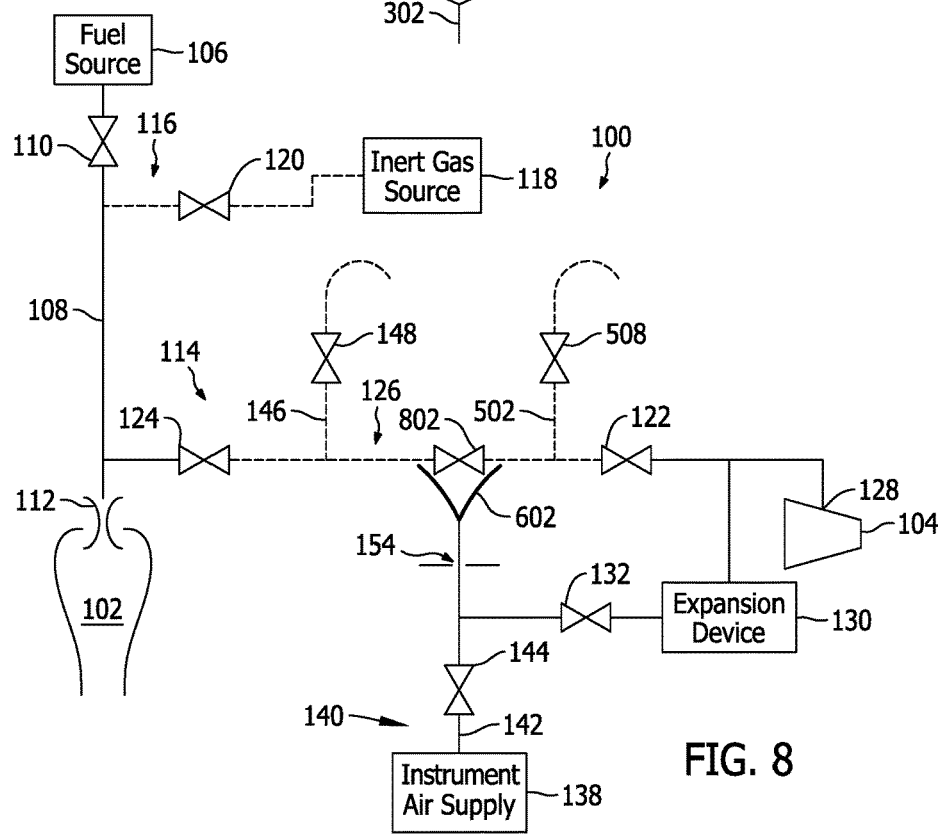
FIG. 8 is a schematic piping diagram of the fuel supply system in accordance with still another exemplary embodiment of the present disclosure.

FIG. 8 is a schematic piping diagram of a fuel supply system 100 for a combustion chamber 102 of a gas turbine engine (not shown) in accordance with another exemplary embodiment of the present disclosure. In the example embodiment, cavity 126 includes a cavity isolation valve 802 configured to separate cavity 126 into two half-cavities that avoids any mixture of ventilation air flow evacuated towards their respective vents. Ventilation air flow is provided by branch 140 that includes a single supply line 142 in which instrumentation air is supplied from an instrumentation air supply 138 through an instrument air isolation valve 144 for controlling flow of instrument air to cavity 126. Due to the physical separation created by cavity isolation valve 802, and the supply of relatively low temperature air toward the two cavities, this fluid separation mode may support a relatively higher counter-pressure due to the significant leaks than the embodiment of FIG. 6, for example, in the event where valve upstream purge circuit isolation valve 122 or valve downstream purge circuit isolation valve 124 is not completely closed, thus letting a non-negligible flow pass.

Figure 9:
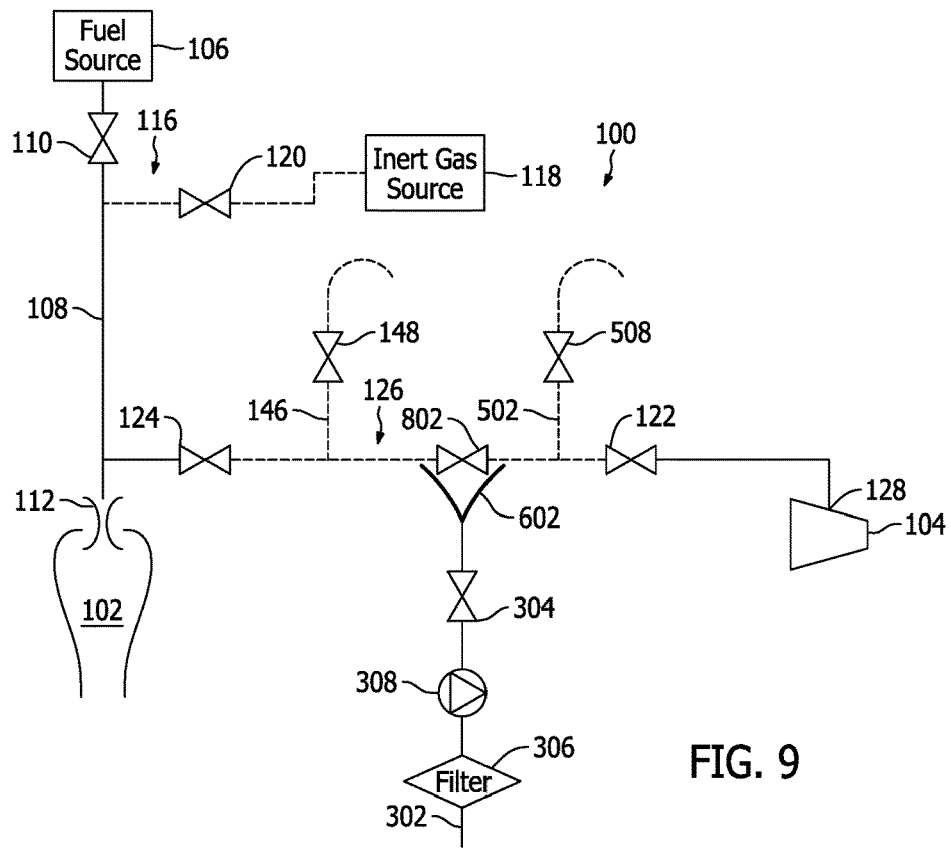
FIG. 9 is a schematic piping diagram of the fuel supply system in accordance with yet another exemplary embodiment of the present disclosure.

FIG. 9 is a schematic piping diagram of a fuel supply system 100 for a combustion chamber 102 of a gas turbine engine (not shown) in accordance with another exemplary embodiment of the present disclosure. In the example embodiment, cavity 126 includes a cavity isolation valve 802 configured to separate cavity 126 into two half-cavities that avoids any mixture of ventilation air flow evacuated towards their respective vents. Ventilation air flow is provided by fan 308 positioned in line 302 between fresh air isolation valve 304 and filter 306 to maintain forced ventilation of ambient air into cavity 126.

Due to the physical separation created by cavity isolation valve 802, this fluid separation mode may support a counter-pressure due to the significant leaks, for example, in the event where valve upstream purge circuit isolation valve 122 or valve downstream purge circuit isolation valve 124 is not completely closed, thus letting a non-negligible flow pass.

Figure 10:
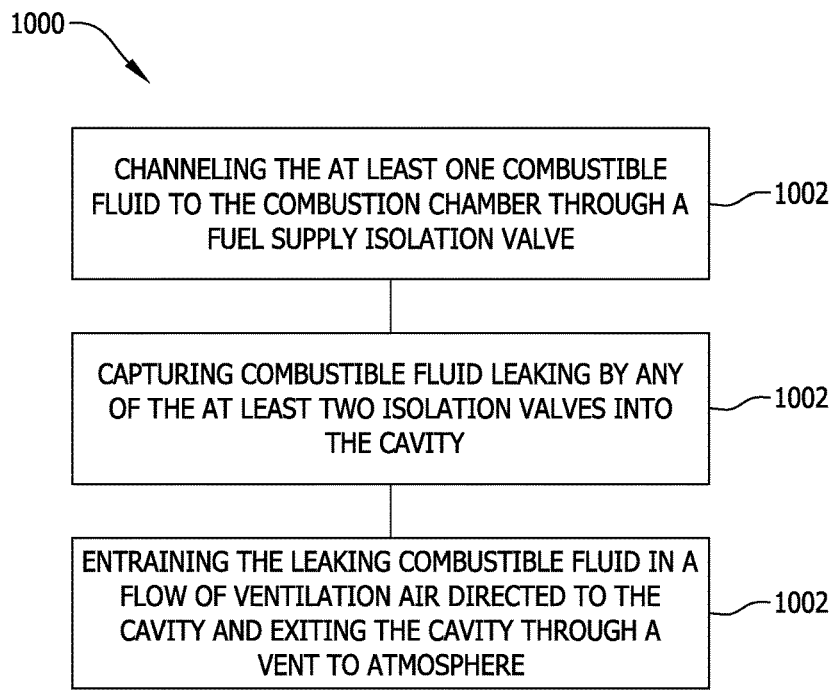
FIG. 10 is a flow chart of a method of supplying combustion chamber (shown in FIGS. 1 and 3-9) with at least one combustible fluid using the fuel supply system (shown in FIGS. 1 and 3-9).

FIG. 10 is a flow chart of a method 1000 of supplying a combustion chamber with at least one combustible fluid using a fuel supply system. The fuel supply system is coupled in flow communication with a first purge system. The first purge system includes at least two isolation valves that define a cavity therebetween. The method includes channeling 1002 the at least one combustible fluid to the combustion chamber through a fuel supply isolation valve, capturing 1004 combustible fluid leaking by any of the at least two isolation valves into the cavity, and entraining 1006 the leaking combustible fluid in a flow of ventilation air directed to the cavity and exiting the cavity through a vent to atmosphere.

The above-described method and system provide a cost-effective method for reducing a potential mixture of leaking fuel gas and relatively high temperature purge air. Specifically, potential sources of fuel gas and the high temperature purge gas are isolated from each other by a ventilated cavity. More specifically, when fuel is supplied to the combustion chamber at relatively high pressure there is a potential for some leakage of fuel through a high temperature air purge isolation valve. By interposing a ventilated space downstream of the potential leakage path, mixing of the fuel gas and relatively high temperature purge air is prevented. The system also provides a controller that safely aligns system valves for the various operational and transition phases during various operational modes of the system.

Exemplary embodiments of fuel supply systems are described above in detail. The fuel supply systems and methods of operating such systems and devices are not limited to the specific embodiments described herein, but rather, components of systems and/or steps of the methods may be utilized independently and separately from other components and/or steps described herein. For example, the methods may also be used in combination with other systems requiring robust isolation of gaseous and/or liquid fluids and are not limited to practice with only the systems and methods as described herein. Rather, the exemplary embodiment can be implemented and utilized in connection with many other flow applications that are currently configured to receive and accept fluids that are not desired to be mixed.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel supply system for supply of a combustion chamber with at least one combustible fluid, said fuel supply system comprising:
   the combustion chamber comprising a fuel injector;
   a remote control unit;
   at least one combustible fluid supply circuit configured to supply said combustion chamber with a combustible fluid and comprising a fuel supply isolation valve; and
   at least one purge circuit comprising a branch line coupled to said at least one combustible fluid supply circuit between said fuel supply isolation valve and said combustion chamber, said purge circuit comprising:
      in series along said branch line, a first purge circuit isolation valve, a second purge circuit isolation valve, and a source of relatively high temperature purge air, wherein a cavity is defined between said first and second purge circuit isolation valves;
      a pipe extending between, and coupled in flow communication with, said cavity and a source of relatively low temperature ventilation air, said source of relatively low temperature ventilation air different than said source of relatively high temperature purge air;
      a low temperature ventilation air isolation valve operatively coupled to said pipe;
      a vent coupled in flow communication to said cavity; and
      a first vent isolation valve operatively coupled to said vent,
   wherein said remote control unit is configured to control a sequence of operation of said fuel supply isolation valve, said first and second purge circuit isolation valves, said low temperature ventilation air isolation valve, and said first vent isolation valve in a first mode in which said fuel supply isolation valve is open, said first and second purge circuit isolation valves are closed, said low temperature ventilation air isolation valve is open, and said first vent isolation valve is open, such that said at least one purge circuit channels a flow of relatively low temperature ventilation air from said source of relatively low temperature ventilation air through said cavity to said vent during operation of said combustion chamber, the flow of relatively low temperature ventilation air entraining at least some of a leakage of combustible fluid into said cavity and carrying the leaked combustible fluid from said cavity and out through said vent.

2. The fuel supply system of claim 1, wherein said vent is configured to release the flow of relatively low temperature ventilation air outside said fuel supply system.

3. The fuel supply system of claim 1, wherein said vent comprises two vents positioned proximate said respective first and second isolation valves defining said cavity therebetween.

4. The fuel supply system of claim 1, wherein said cavity includes an aerodynamic profile configured to facilitate separation of the flow of relatively low temperature ventilation air.

5. The fuel supply system of claim 1, wherein said cavity includes an aerodynamic profile configured to separate the flow of relatively low temperature ventilation air into two streams and to direct the flows of relatively low temperature ventilation air in opposite directions through said cavity.

6. The fuel supply system of claim 1, wherein said cavity includes an aerodynamic profile comprising a single inlet, a first arcuate flow path beginning proximate said single inlet, and a second arcuate flow path beginning proximate said single inlet, said second arcuate flow path terminating in a flow direction opposite a flow direction of said first flow path.

7. The fuel supply system of claim 1, further comprising a second purge circuit of said combustible fluid supply circuit connected to a source of inert gas.

8. The fuel supply system of claim 1, wherein said source of relatively low temperature ventilation air comprises a source of instrument air associated with an instrument air flow setting valve.

9. The fuel supply system of claim 1, wherein said at least one purge circuit comprises a compressor and expansion and cooling devices configured to inject a cooled flow of purge air from said compressor into said cavity.

10. The fuel supply system of claim 1, wherein said at least one purge circuit comprises a calibrated passage for adjusting the ventilation air flow injected into said cavity.

11. The fuel supply system of claim 1, wherein said at least one purge circuit comprises an ambient air extraction branch including a filter and a valve configured to set an ambient air flow and a fan capable of causing a forced ambient air flow in said cavity.

12. The fuel supply system of claim 1, wherein said cavity comprises a cavity isolation valve separating said cavity into two secondary cavities in which the two ventilation flows are respectively injected.

13. A method of supplying a combustion chamber with at least one combustible fluid using a fuel supply system, said method implemented by a remote control unit and comprising:

channeling the at least one combustible fluid to the combustion chamber through a combustible fluid supply circuit by opening a fuel supply isolation valve, wherein at least one purge circuit includes a branch line coupled to the combustible fluid supply circuit between the fuel supply isolation valve and the combustion chamber, the purge circuit including:
in series along the branch line, a first purge circuit isolation valve, a second purge circuit isolation valve, and a source of relatively high temperature purge air, wherein a cavity is defined between the first and second purge circuit isolation valves;
a pipe extending between, and coupled in flow communication with, the cavity and a source of relatively low temperature ventilation air;
a low temperature ventilation air isolation valve operatively coupled to the pipe;
a vent coupled in flow communication to the cavity; and
a first vent isolation valve operatively coupled to the vent;
closing the first and second purge circuit isolation valves, further comprising capturing in the cavity combustible fluid leaking by any of the first and second purge circuit isolation valves into the cavity; and
opening the low temperature ventilation air isolation valve and the first vent isolation valve, thereby entraining the leaking combustible fluid in a flow of ventilation air directed to the cavity and exiting the cavity through the vent to atmosphere.

14. The method of claim 13, wherein entraining the leaking combustible fluid comprises entraining the leaking combustible fluid in the flow of ventilation air directed to the cavity from a compressor.

15. The method of claim 13, wherein entraining the leaking combustible fluid comprises entraining the leaking combustible fluid in the flow of ventilation air directed to the cavity from a compressor through at least one of an expansion device and a cooling device.

16. The method of claim 15, wherein entraining the leaking combustible fluid comprises entraining the leaking combustible fluid in the flow of ventilation air directed to the cavity from a calibrated passage.

17. The method of claim 13, wherein entraining the leaking combustible fluid comprises entraining the leaking combustible fluid in the flow of ventilation air directed to the cavity from an instrument air source.

18. The method of claim 13, wherein entraining the leaking combustible fluid comprises entraining the leaking combustible fluid in the flow of ventilation air directed to the cavity from ambient.

19. The method of claim 13, wherein entraining the leaking combustible fluid comprises entraining the leaking combustible fluid in the flow of ventilation air generated by a fan in at least one of the vent to atmosphere and the flow of ventilation air directed to the cavity.

20. A gas turbine engine system comprising:
a compressor comprising a low pressure inlet, a high pressure outlet, and a bleed port configured to extract air at a pressure between said low pressure inlet and said high pressure outlet;
a combustion chamber comprising a fuel injector;
a turbine coupled in serial flow communication with said compressor and said combustion chamber;

a remote control unit at least one combustible fluid supply circuit configured to supply said combustion chamber with a combustible fluid and comprising a fuel supply isolation valve; and at least one purge circuit comprising a branch line coupled to said at least one combustible fluid supply circuit between said fuel supply isolation valve and said combustion chamber, said purge circuit comprising:
- in series along said branch line, a first purge circuit isolation valve, a second purge circuit isolation valve, and a source of relatively high temperature purge air, wherein a cavity is defined between said first and second purge circuit isolation valves;
- a pipe extending between, and coupled in flow communication with, said cavity and a source of relatively low temperature ventilation air;
- a low temperature ventilation air isolation valve operatively coupled to said pipe;
- a vent coupled in flow communication to said cavity; and
- a first vent isolation valve operatively coupled to said vent, wherein said remote control unit is configured to control a sequence of operation of said fuel supply isolation valve, said first and second purge circuit isolation valves, said low temperature ventilation air isolation valve, and said first vent isolation valve in a first mode in which said fuel supply isolation valve is open, said first and second purge circuit isolation valves are closed, said low temperature ventilation air isolation valve is open, and said first vent isolation valve is open, such that said at least one purge circuit channels a flow of relatively low temperature ventilation air from said source of relatively low temperature ventilation air through said cavity to said vent during operation of said combustion chamber, the flow of relatively low temperature ventilation air entraining at least some of a leakage of combustible fluid into said cavity and carrying the leaked combustible fluid from said cavity and out through said vent.

* * * * *